(12) United States Patent
Grasselli

(10) Patent No.: US 11,286,075 B2
(45) Date of Patent: Mar. 29, 2022

(54) MACHINE FOR LAYING SLICED FOOD PRODUCTS IN CONTAINERS

(71) Applicant: GRASSELLI S.P.A., Albinea (IT)

(72) Inventor: Giorgio Grasselli, Albinea (IT)

(73) Assignee: GRASSELLI S.P.A., Albinea (IT)

( * ) Notice: Subject to any disclaimer, the term of this patent is extended or adjusted under 35 U.S.C. 154(b) by 43 days.

(21) Appl. No.: 15/794,860

(22) Filed: Oct. 26, 2017

(65) Prior Publication Data
US 2018/0118388 A1  May 3, 2018

(30) Foreign Application Priority Data

Nov. 2, 2016 (IT) .................... 102016000110158

(51) Int. Cl.
*B65B 59/00* (2006.01)
*B65G 47/71* (2006.01)
(Continued)

(52) U.S. Cl.
CPC ........ *B65B 59/005* (2013.01); *A22C 17/0033* (2013.01); *B65B 5/101* (2013.01);
(Continued)

(58) Field of Classification Search
CPC ....... B65B 25/06; B65B 25/065; B65B 35/10; B65B 57/10; B65B 59/005; B65B 5/101; B65B 25/064; B65G 21/14; B65G 43/10; B65G 47/50; B65G 47/715; B65G 15/105; B65G 15/28; B65G 2201/0202; A22C 17/0033

(Continued)

(56) References Cited

U.S. PATENT DOCUMENTS

| 4,155,441 A * | 5/1979 | Albrecht ................ A21C 15/00 |
| | | 198/419.2 |
| 4,630,725 A * | 12/1986 | Steurmer ........... B65G 47/1492 |
| | | 198/419.1 |
| 5,123,231 A | 6/1992 | Fallas et al. |
| 6,659,445 B2 * | 12/2003 | Boss ................. B65H 29/6609 |
| | | 271/184 |

(Continued)

FOREIGN PATENT DOCUMENTS

| DE | 2516583 A1 | 10/1976 |
| WO | 2005/123513 A1 | 12/2005 |

*Primary Examiner* — Chelsea E Stinson
*Assistant Examiner* — Scott A Howell
(74) *Attorney, Agent, or Firm* — Pearne & Gordon LLP

(57) ABSTRACT

The machine (1) for laying sliced food products (2) in containers (3), comprises: a first conveyor (4) able to convey slices (2) or groups of slices (2) along at least one advancement direction and provided with an end portion (40) from which the slices (2) are released; a second conveyor (5) able to convey containers (3) suitable for receiving one or more slices (2) from the end portion (40) of the first conveyor (4), the second conveyor (5) being placed below the first conveyor (4); and a positioning apparatus (45, 46, 47, 81, 82) for regulating the arrangement of the first and the second conveyor (4, 5) with respect to each other.

The machine (1) further comprises a detection apparatus (6) able to determine the arrangement of the slices (2) or of the groups of slices (2) on the first conveyor (4), and a processing unit (7) connected to the positioning and detection apparatuses and configured to control the activation of the positioning apparatus according to detections carried out by the detection apparatus (6).

15 Claims, 13 Drawing Sheets

(51) Int. Cl.
*A22C 17/00* (2006.01)
*B65B 5/10* (2006.01)
*B65B 25/06* (2006.01)
*B65B 35/10* (2006.01)
*B65B 57/10* (2006.01)
*B65G 43/10* (2006.01)
*B65G 47/50* (2006.01)
*B65G 15/10* (2006.01)
*B65G 15/28* (2006.01)

(52) U.S. Cl.
CPC ............ *B65B 25/06* (2013.01); *B65B 25/064* (2013.01); *B65B 25/065* (2013.01); *B65B 35/10* (2013.01); *B65B 57/10* (2013.01); *B65G 43/10* (2013.01); *B65G 47/50* (2013.01); *B65G 47/715* (2013.01); *B65G 15/105* (2013.01); *B65G 15/28* (2013.01); *B65G 2201/0202* (2013.01)

(58) Field of Classification Search
USPC .......................................................... 53/493
See application file for complete search history.

(56) References Cited

U.S. PATENT DOCUMENTS

| | | | | |
|---|---|---|---|---|
| 6,935,215 | B2 * | 8/2005 | Lindee | B26D 7/0683 |
| | | | | 83/74 |
| 7,021,450 | B2 * | 4/2006 | Jones, Jr. | B65G 21/14 |
| | | | | 198/418.9 |
| 7,069,845 | B2 * | 7/2006 | Righele | B65B 19/34 |
| | | | | 99/353 |
| 7,413,070 | B2 * | 8/2008 | Mayer | B65B 5/101 |
| 7,941,990 | B2 * | 5/2011 | Aquarius | B65B 35/44 |
| | | | | 53/48.1 |
| 9,102,428 | B2 * | 8/2015 | Grasselli | B65B 35/44 |
| 9,533,784 | B2 * | 1/2017 | Van Gerwen | B65B 65/003 |
| 2003/0196871 | A1 * | 10/2003 | Jones, Jr. | B65G 43/10 |
| | | | | 198/460.2 |
| 2010/0101191 | A1 | 4/2010 | Lindee | |
| 2010/0107835 | A1 | 5/2010 | Lindee | |
| 2010/0107836 | A1 | 5/2010 | Lindee | |
| 2012/0159900 | A1 * | 6/2012 | Grasselli | B65G 47/90 |
| | | | | 53/235 |
| 2013/0291483 | A1 * | 11/2013 | Van Gerwen | B65B 35/00 |
| | | | | 53/113 |
| 2014/0090956 | A1 | 4/2014 | Lindee | |
| 2020/0262659 | A1 * | 8/2020 | Fox | A22C 17/0093 |

\* cited by examiner

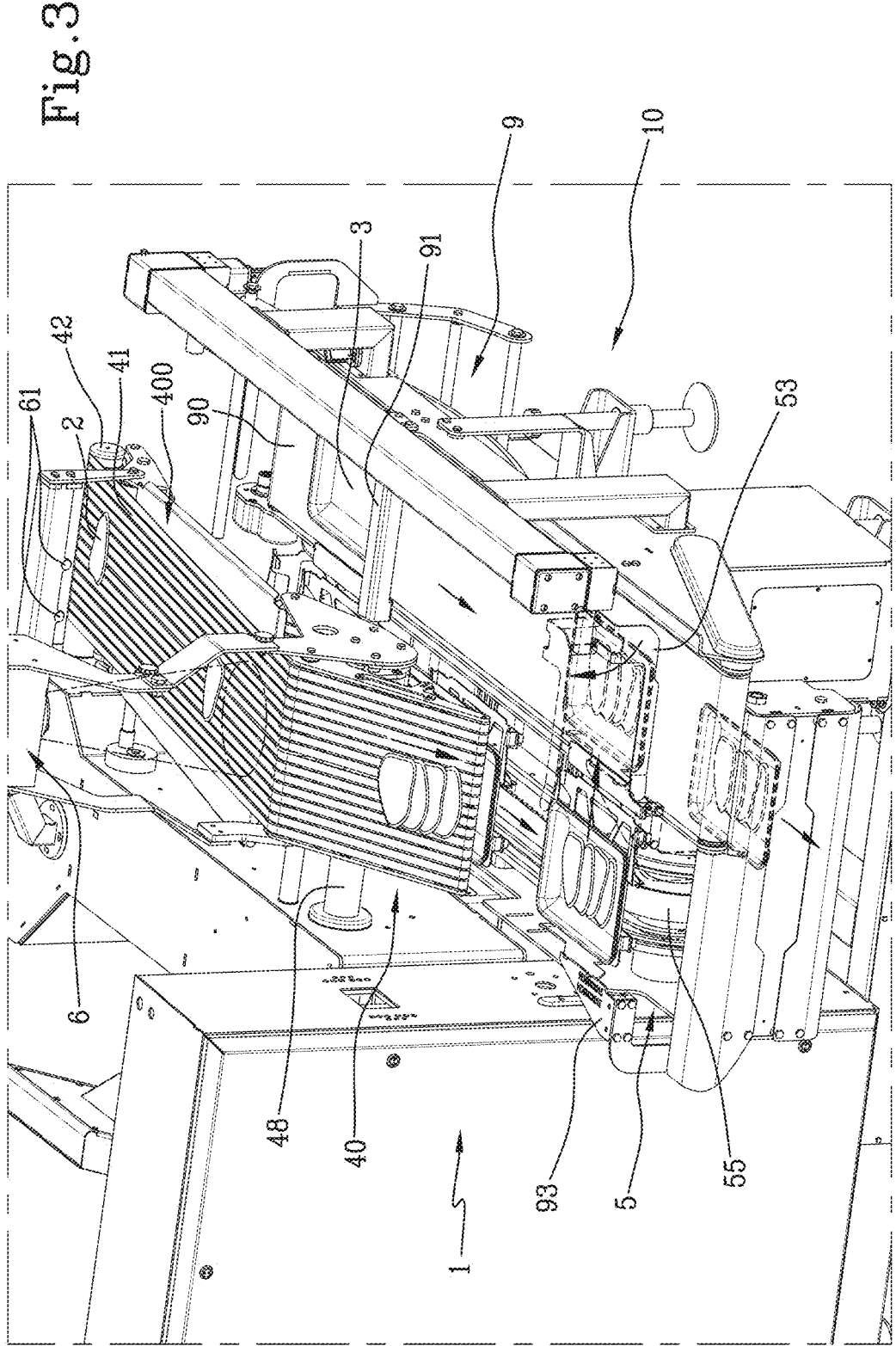

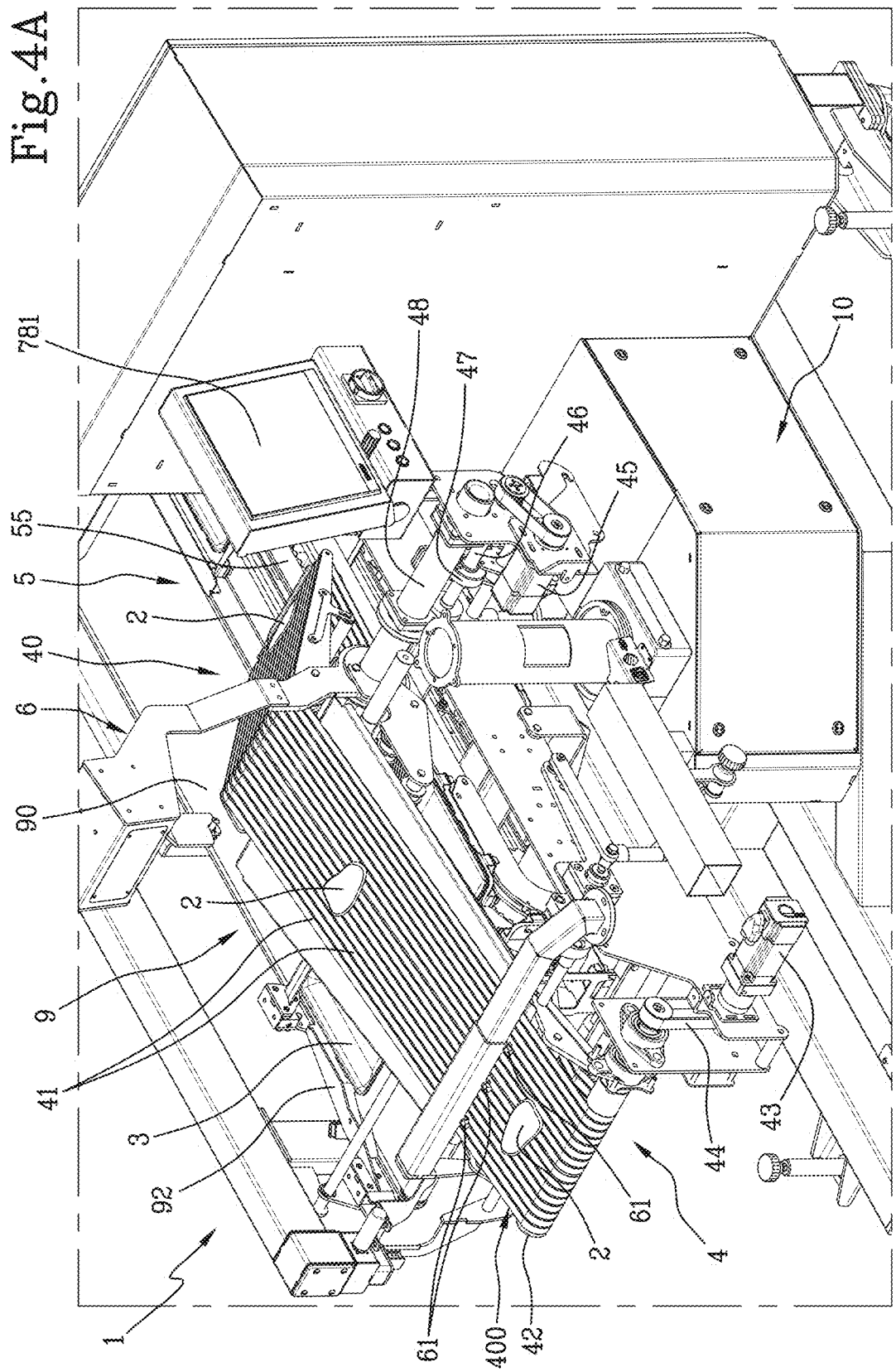

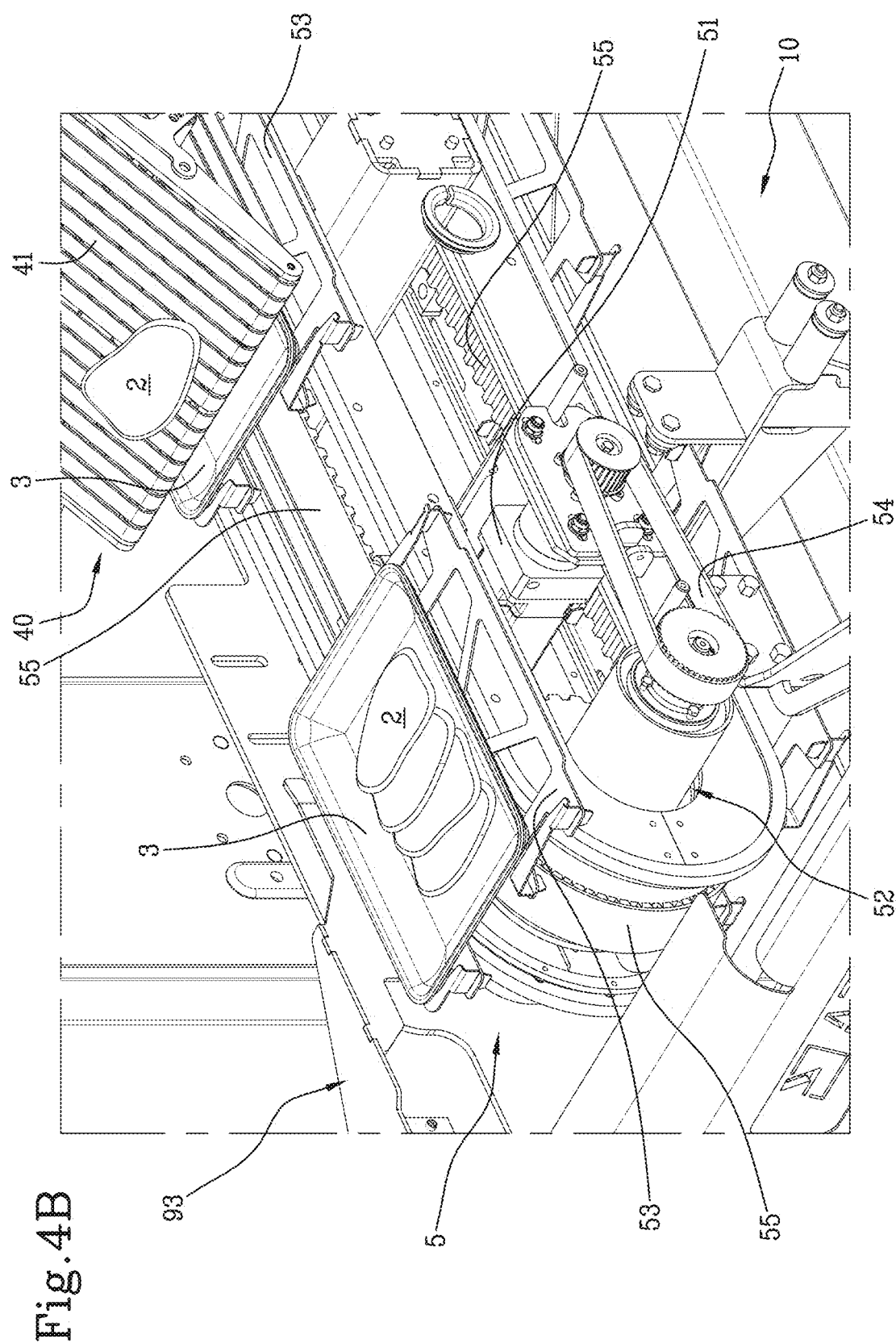

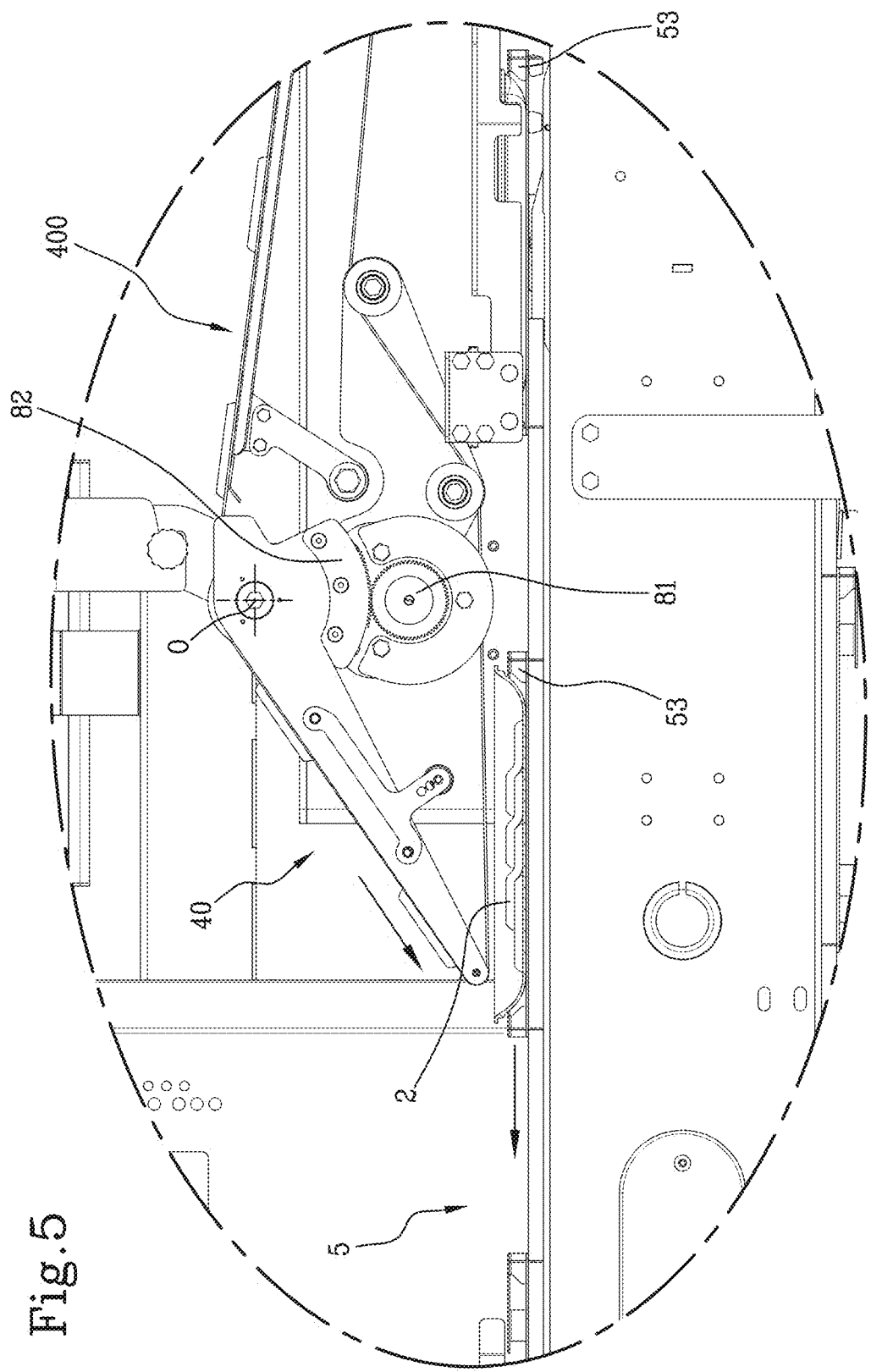

MACHINE FOR LAYING SLICED FOOD PRODUCTS IN CONTAINERS

The present invention refers to a machine for laying sliced food in containers.

In particular, the invention especially, but not exclusively, concerns laying slices obtained by cutting a fresh or cooked product constituted by meat, poultry or vegetables that are preferably boneless or free of cartilage.

There are known automatic machines used by the food industry that are devised for laying slices of meat, such as slices of chicken breasts, or other products, in food trays.

These machines are placed downstream of devices for cutting the product and upstream of a section for packaging the trays.

In particular, the machines of the prior art comprise a tray packaging station that takes care of inserting "packs" into the trays, said "packs being made up of a number of slices, which partially overlap each other.

Some of the machines on the market today also comprise an additional station arranged upstream of the tray packaging station and provided to compose the packs starting from single slices. Alternatively, the composition of the packs can be carried out manually by designated personnel.

The machines of the prior art have several drawbacks, which are listed herein below.

First of all, the centering of the pack in the tray is not always uniform, that is to say, different packs having the same number of slices of the same type of product prove to be positioned in the respective trays differently and they are often not well centred therein.

This drawback negatively affects the presentation of the product packaged on the tray, that is, its aesthetic appeal, and it can sometimes make the final packaging less effective or more problematic.

Furthermore, the machines of the prior art do not provide for good flexibility in the composition of the pack, that is, flexibility of the manner in which the slices are arranged side by side and overlap each other, as well as in the distribution thereof along the receiving surface of the trays.

Therefore, in the sector to which the invention refers, the need for a machine that enables the individual operator to decide how the slices should be arranged with respect to each other and with respect to the trays, according to production or commercial needs, has been present for quite some time.

Therefore, the technical task underlying the present invention is to offer a machine for laying sliced foods in containers that is capable of overcoming the drawbacks of the prior art cited hereinabove.

The technical task is achieved by the machine realized in accordance with claim 1.

Further characteristics and advantages of the present invention will become more apparent from the approximate and thus non-limiting description of a preferred, but not exclusive, embodiment of a machine for laying food products, as illustrated in the accompanying drawings, of which:

FIGS. 1, 2 and 3 are axonometric views of the machine of the invention, from different angles.

FIG. 4A is an axonometric view of the machine appearing in the previous figures, from an additional, different angle, in which a portion of the casing has been removed, exposing several actuators and other components.

FIG. 4B is an axonometric view showing a front portion of the machine at a carousel conveyor for handling the trays and in which part of the casing has been removed so as to expose an actuator of the carousel conveyor and other components.

FIGS. 5-9 are partially cutaway side views representing different operative configurations of a central portion of the machine.

Figure 1:
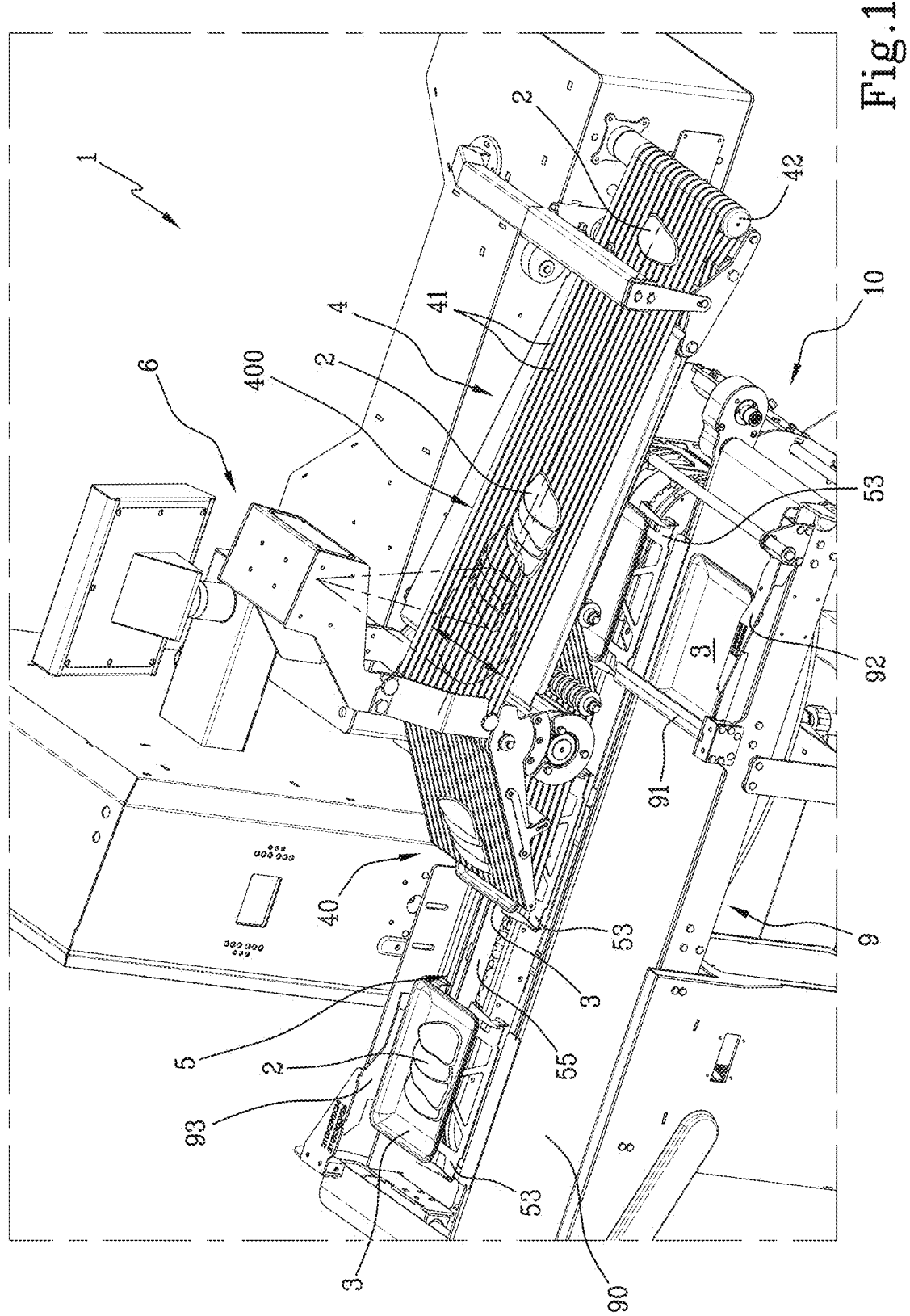
Figure 2:
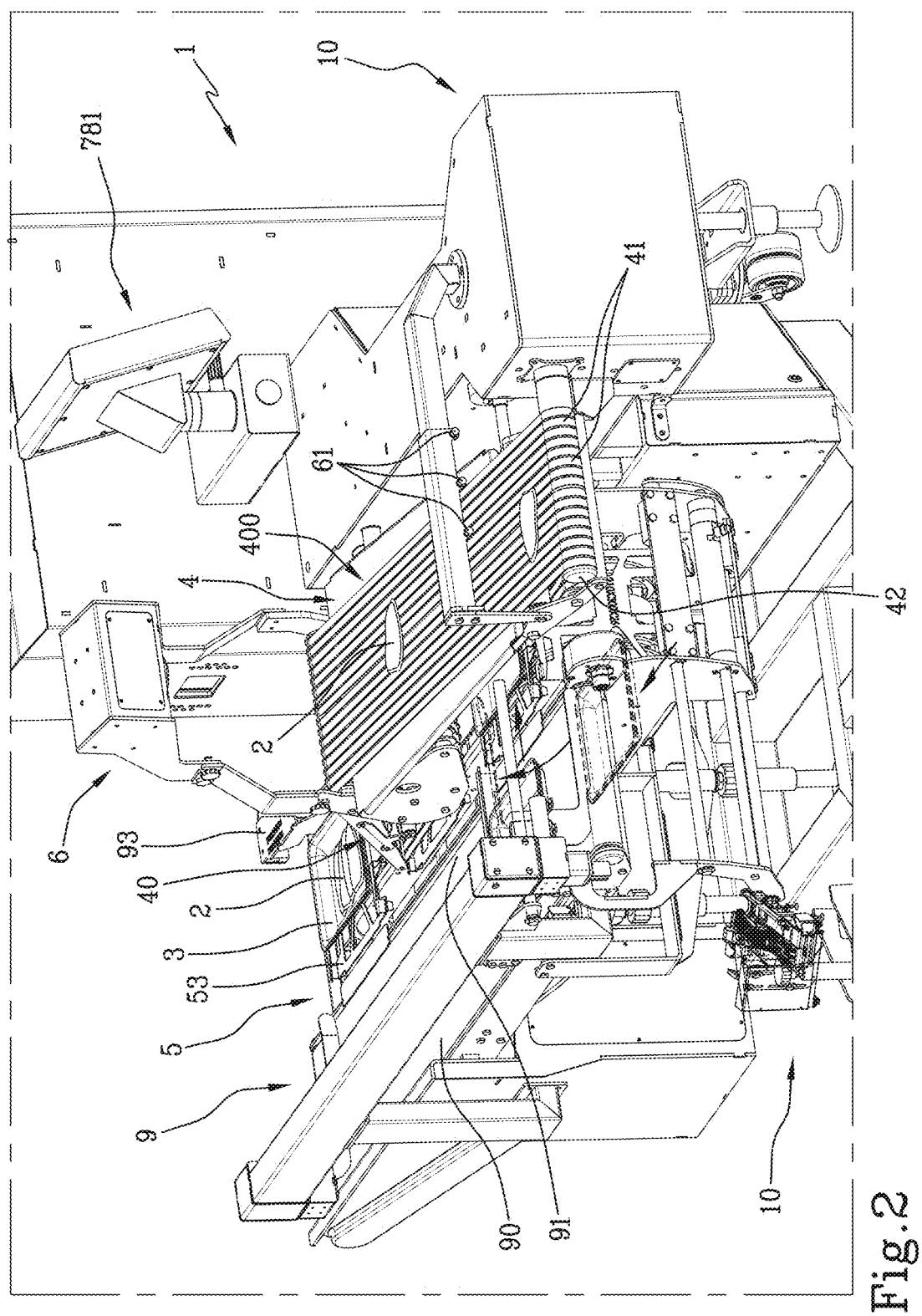

With reference to the figures cited, an automatic machine for laying sliced products 2 in containers 3, for example on food trays, in accordance with the invention, is indicated by the number 1.

In particular, the proposed machine 1 finds use in the food industry and it is especially intended for tray packaging slices 2 obtained from cutting a product constituted by fresh or cooked meat or poultry, fish, or vegetables that are preferably boneless or free of cartilage.

In even further detail, the machine 1 can serve to lay one slice 2 at a time in a container 3 and to lay a so-called "pack" made up of a plurality of slices 2 arranged in an ordered configuration.

The "packs", as they are called in the technical jargon of this sector, are made up of a number of slices 2, preferentially partially overlapping each other, that is, overlapping each other in a staggered manner.

Herein below, the single slices 2 or packs shall also be generically called the "sliced product" for the sake of simplicity.

It is noted here that the machine 1 of the invention advantageously makes it possible to tray package pre-arranged packs correctly and to form the packs during the tray packaging of single slices 2 in a given container 3. These aspects shall be dealt with in further detail in the explanation of the operation of the invention.

The machine 1 comprises a support frame 10 provided with a bed for resting it on the ground and said frame 10 supports the devices, apparatuses and means described herein below.

The machine 1 includes a first conveyor 4 that is able to convey loose slices 2 or groups of slices 2 (i.e., "packs") along a first conveying direction.

The first conveyor, which is shown in its entirety in FIGS. 1-4A, preferentially comprises an elongated conveying device 4 that continuously drags a succession of sliced products 2 along the direction of longitudinal extension thereof.

The slices 2 or the packs are loaded onto the conveyor 4 manually or by another machine 1, or, if necessary, by means of a magazine provided in a station upstream of the proposed machine 1.

The first conveyor 4 can comprise flexible, closed-loop dragging means 41 on at least two wheels 42 (of which at least one is a driving wheel and thus motorized); said dragging means can include a set of straps 41 set side by side (as in the example illustrated) or a belt or suchlike.

In practical terms, the sliced products 2 travel freely resting on the upper transport surface of the first conveyor 4.

The invention comprises a first actuator 43, 44, preferably of an electromechanical type, provided for activation and operation of the first conveyor 4.

In practical terms, the manner in which the first actuator 43, 44 is activated establishes the advancement direction and speed of the first conveyor 4.

In the illustrated example, the first actuator comprises a first electric motor 43 that is connected, by means of a transmission element 44, such as a belt or suchlike, to a first roller, which is inside or in any case, constrained to a driving wheel 42 of the first conveyor 4 (see FIG. 4 in particular).

In further detail, the upper branch of the loop defined about the wheels constitutes a substantially continuous transport surface, for all practical purposes, although it is made up of a plurality of discrete elements, in the case of the use of straps 41, on which the single slices 2 or pre-formed packs are laid in a row.

The first conveyor 4 is provided with an end portion 40, or front "head" piece, at the longitudinal end thereof located downstream with respect to the advancement direction, and from said front head piece 40 the sliced products 2 are released.

Preferentially, the head piece 40 is inclined downwards so as to accompany the slices 2 in their descent towards the assigned container 3. The proposed machine 1 also includes a second conveyor 5, which is able to convey containers 3 and located under the first conveyor 4, so that the containers 3 being conveyed can receive the products 2 released by the first conveyor 4.

The second conveyor 5 is able to advance the containers 3 with a direction parallel to said first conveying direction with which the slices 2 are advanced (see for example the direction arrows in FIG. 3).

The second conveyor 5 is preferentially controlled with a variable advancement direction and speed, according to the modes illustrated below.

The invention comprises a second actuator 51, 52, preferably of an electromechanical type, provided for activation and operation of the second conveyor 5.

The second conveyor can comprise a carousel conveyor 5 arranged vertically, that is, so as to turn about horizontal axes, and that mounts a plurality of attachments 53 suitable for individually engaging a container 3. The carousel conveyor 5 extends longitudinally, parallel to the extension of the first conveyor 4.

The carousel conveyor 5 defines an upper branch thereof that identifies the cited transport path of the trays 3.

The attachments 53 travel along the first branch and are facing upwards and able to releasably engage a tray 3 that receives the sliced products 2 in a resting position, from the upper conveyor.

The carousel conveyor 5 includes two wheels of its own, about which the attachments 53 turn, for example dragged by a central belt 55 moved by one or both wheels.

As shown in FIG. 4B, the second actuator can comprise a second motor 51 connected to one of the wheels, which, in turn, drags the cited central belt 55.

The motorized wheel can be solidly constrained to a roller 52 connected to the motor 51, for example by means of pulleys and belts 54 or according to other modes suited to the purpose.

Note that, preferentially, on its upper branch, the second conveyor 5 defines a horizontal transport path for the trays 3, whereas the first conveyor 4, which is above the second conveyor 5, can define a transport path for the slices 2 that is partly inclined with respect to the horizontal direction.

In further detail, the first conveyor 4 can comprise a first rectilinear portion 400 arranged upstream of the head piece 40 and inclined upwards, so as to define with the same head piece 40, which is also rectilinear, a sort of upside-down V.

Preferentially, the first conveyor 4 overlies the second conveyor 5, without contact between them, and the second conveyor 5 extends beyond the end portion 40 of the first conveyor 4 in the direction of advancement.

In other words, taking an ideal vertical plane passing through the end edge of the end portion 40 as the reference point, there can be defined a first half-space, which includes both the first conveyor 4 and the second conveyor 5, and a second half-space, which comprises only the second conveyor 5.

Preferentially, the distance between the second conveyor 5 and the end edge of the head piece 40 can be determined so that each slice 2 released by the first conveyor 4 is rested on the receiving surface of the relative container 3 gradually and progressively and does not drop all at once from the first conveyor 42 to then land on the container 3 itself.

Note that as partly explained above, the end portion 40 is arranged obliquely with respect to the advancement direction of the second conveyor 5 and also with respect to the part 400 of the first conveyor 4 that is found upstream.

Preferentially, the end portion 40 is mounted in an oscillatable manner with respect to the remaining part 400 upstream of the first conveyor 4, for example by means of a hinge, in any case about an axis of oscillation O transverse to the length of the first conveyor 4 (see FIGS. 5-9).

This aspect shall be dealt with in further detail herein below.

Advantageously, the invention comprises a positioning apparatus 45, 46, 47, 81, 82 that is able to vary the arrangement of the two conveyors 5, 5 with respect to each other.

In particular, the positioning apparatus varies the position and/or configuration of the two conveyors 4, 5 with respect to each other.

Preferentially, the position and/or configuration of the first conveyor 4 can be varied and regulated, whereas the position of the second conveyor 5 with respect to the frame 10 of the machine 1 is fixed.

Obviously, the second conveyor 5 is understood as being fixed in its location inside the machine 1, considering it in its entirety, even if it obviously includes moving parts.

According to an important aspect of the invention, the machine 1 includes a detection apparatus 6 that is able to determine the arrangement of the slices 2 or of the packs handled by the first conveyor 4.

In particular, the detection apparatus 6 is capable of detecting at least the location of each slice 2 or each pack on the traction surface of the first conveyor 4.

As partly described above, the traction surface is described here as one whole element even in the case in which it is formed by the set of contiguous surfaces of said straps 41 of the first conveyor 4.

In practical terms, the relative position of the slice 2 or of the pack with respect to the traction surface is detected.

In even further detail, detection of the position of the slice 2 (or pack) with respect to the opposite lateral edges of the traction surface can be comprised.

The detection apparatus 6 preferentially comprises an image acquisition device, such as a video camera or similar devices, arranged above the first conveyor 4 and pointed towards the traction surface (in FIGS. 1 and 3 a lens cone of vision of the video camera is schematically indicated).

The detection apparatus 6 can be arranged upstream of or at the end portion 40 of the first conveyor 4.

Preferentially, this apparatus 6 is mounted upstream and in the proximity of the end portion 40, that is, slightly before the point in which the traction surface is inclined downwards.

A position sensor 61 such as a photocell or similar devices can also be provided, located along the transport path of the sliced products 2, upstream of the detection apparatus 6, at a predefined distance from the latter.

In the illustrated example, three horizontally aligned position sensors 61 are shown (FIGS. 2-4A).

In this case, the activation of the detection apparatus 6 can be subject to the detection of a sliced product 2 by the position sensor 61.

For example, following detection by the sensor 61, the detection apparatus 6 can be activated after an activation time as a function of the distance between the sensor 61 and the detection apparatus 6.

Figure 10:
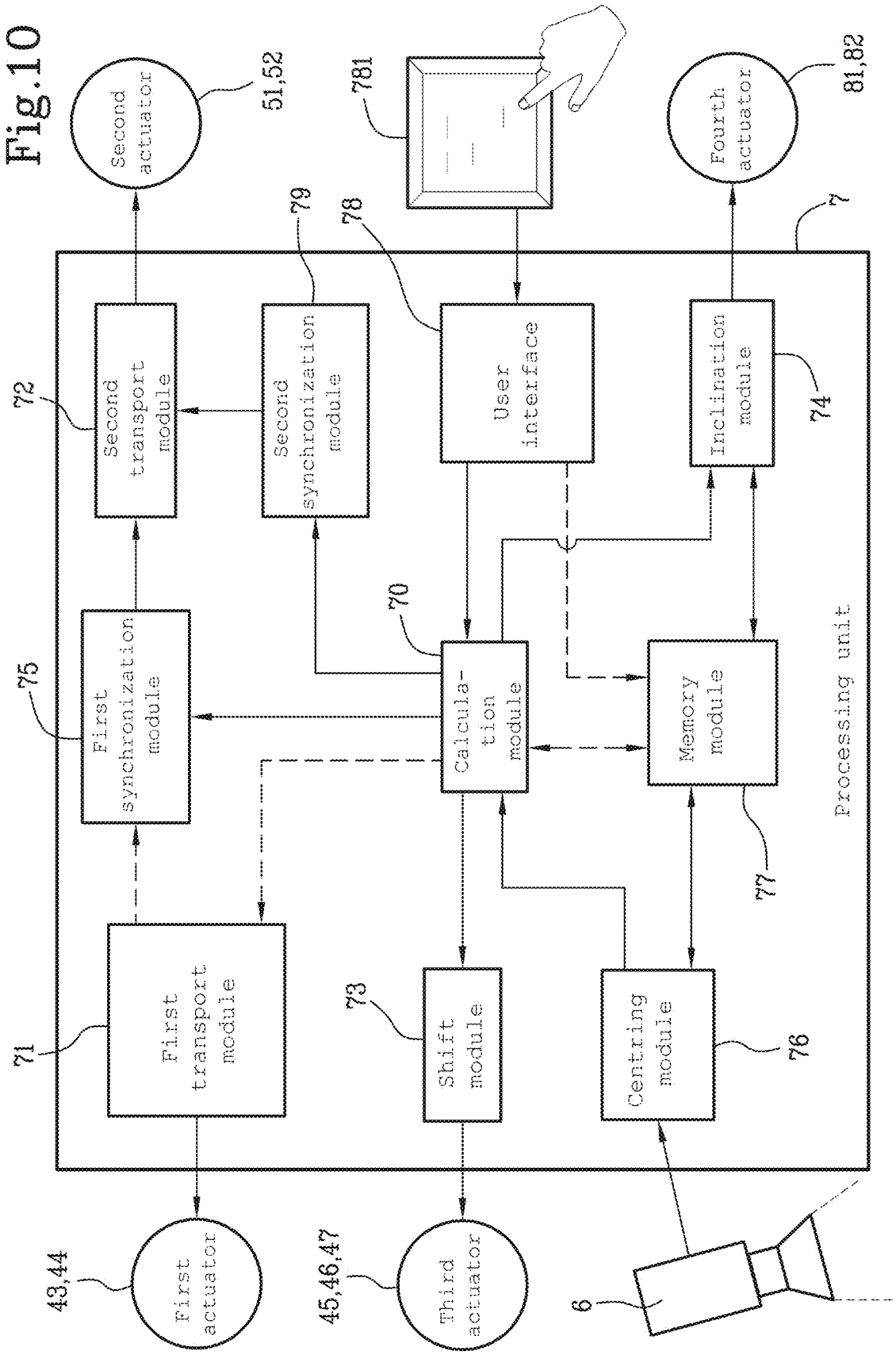
FIG. 10 is a schematic representation of the processing unit of the machine.
Figure 11:
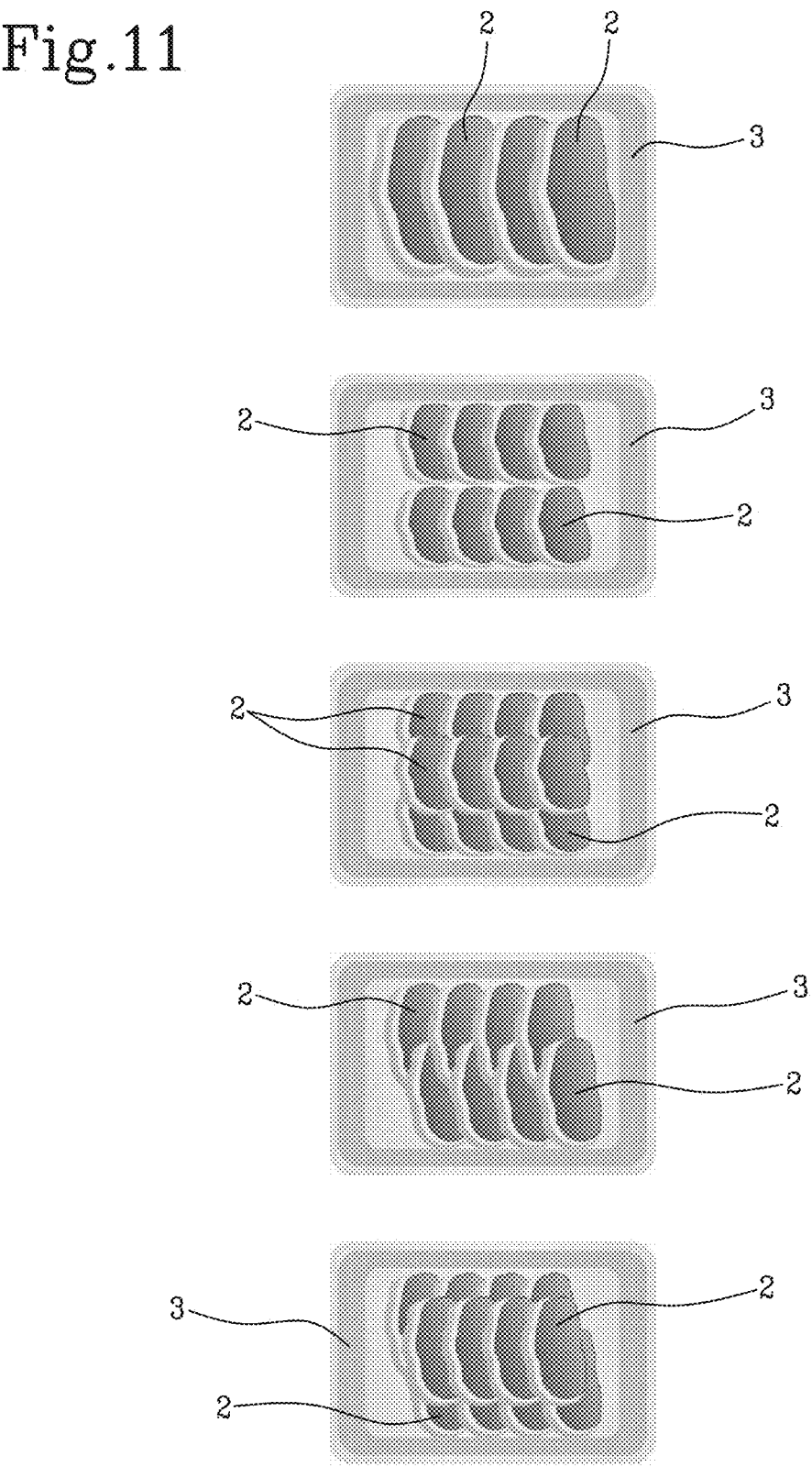
FIG. 11 shows a plurality of configurations of slices laid in a tray and that can be obtained with the machine of the invention.

The machine 1 of the invention comprises a processing unit 7 connected to the movement and detection apparatuses and schematically shown in FIG. 10.

In the present description, the processing unit 7 is presented as subdivided into distinct functional modules for the sole purpose of describing the functions thereof clearly and thoroughly.

In practical terms, this processing unit 7 can be constituted by a single electronic device, suitably programmed for performing the functions described, and the various modules can correspond to a hardware entity and/or routine software that are part of the programmed device.

Alternatively or additionally, these functions can be performed by a plurality of electronic devices in which the above-mentioned functional modules can be distributed.

In general, the processing unit 7 can make use of one or more microprocessors or microcontrollers for execution of the instructions contained in the memory modules, and the above-mentioned functional modules can also be distributed in a plurality of computers, locally or remotely, based on the architecture of the network in which they reside.

The processing unit 7 is configured to regulate the arrangement of the first and the second conveyor 5 with respect to each other, based at least on the detections carried out by said detection apparatus 6.

In other words, the processing unit 7 controls the positioning apparatus 45, 46, 47, 81, 82 so that it regulates the arrangement of the two conveyors with respect to each other as a function of the position of the slice 2 or the pack of slices 2 determined by the detection device.

In the preferred embodiment of the invention, in which the first conveyor 4 is movable and the second conveyor 5 is fixed, the processing unit 7 regulates the positioning and/or configuration of the first conveyor 4.

In further detail, the processing unit 7 can include a first transport module 71 configured to regulate the advancement speed and direction of the first conveyor 4.

Preferentially, the first transport module 71 controls the first conveyor 4 because in an operating cycle it moves the first conveyor 4 always in the same direction of advancement of the slices 2, with a constant speed.

However, in principle, an embodiment in which the first conveyor 4 is activated with a variable direction and speed, based on one or more first transport parameters, is not excluded.

To be more precise, the first transport module 71 is configured to generate a first transport signal suitable for determining the direction and speed of the first conveyor 4.

In this case, the first actuator 43, 44 is able to receive said first transport signal from the processing unit 7 and to activate the first conveyor 4 as a result.

Furthermore, the processing unit 7 preferably includes a second transport module 72 configured to vary the advancement speed and direction of the second conveyor 5.

To be more precise, the second transport module 72 is configured to generate a second transport signal suitable for determining the direction and speed of the second conveyor 5.

In even further detail, the second transport module 72 determines the direction and speed with which the second conveyor 5 moves the containers 3, based on second transport parameters.

The second actuator 51, 52 is able to receive said second transport signal from the processing unit 7 and to activate the second conveyor 5 as a result.

The operating modes of the second transport module 72 will be discussed again in further detail below.

Said positioning apparatus preferentially includes a third actuator 45, 46, 47 that is able to move at least a part 40 of the first conveyor 4 transversely to a direction thereof for advancement of the slices 2 or of the groups of slices 2.

In practical terms, the third actuator 45, 46, 47 is capable of moving the first conveyor 4 transversely, preferably in a horizontal direction.

In this manner, at least a part 40 of the first conveyor 4 that includes its inclined end portion 40 can be shifted laterally.

In further detail, the third actuator 45, 46, 47 acts directly on the end portion 40, for example by making it slide with respect to an axis parallel to or coinciding with the access of oscillation O cited above.

Figure 4C:
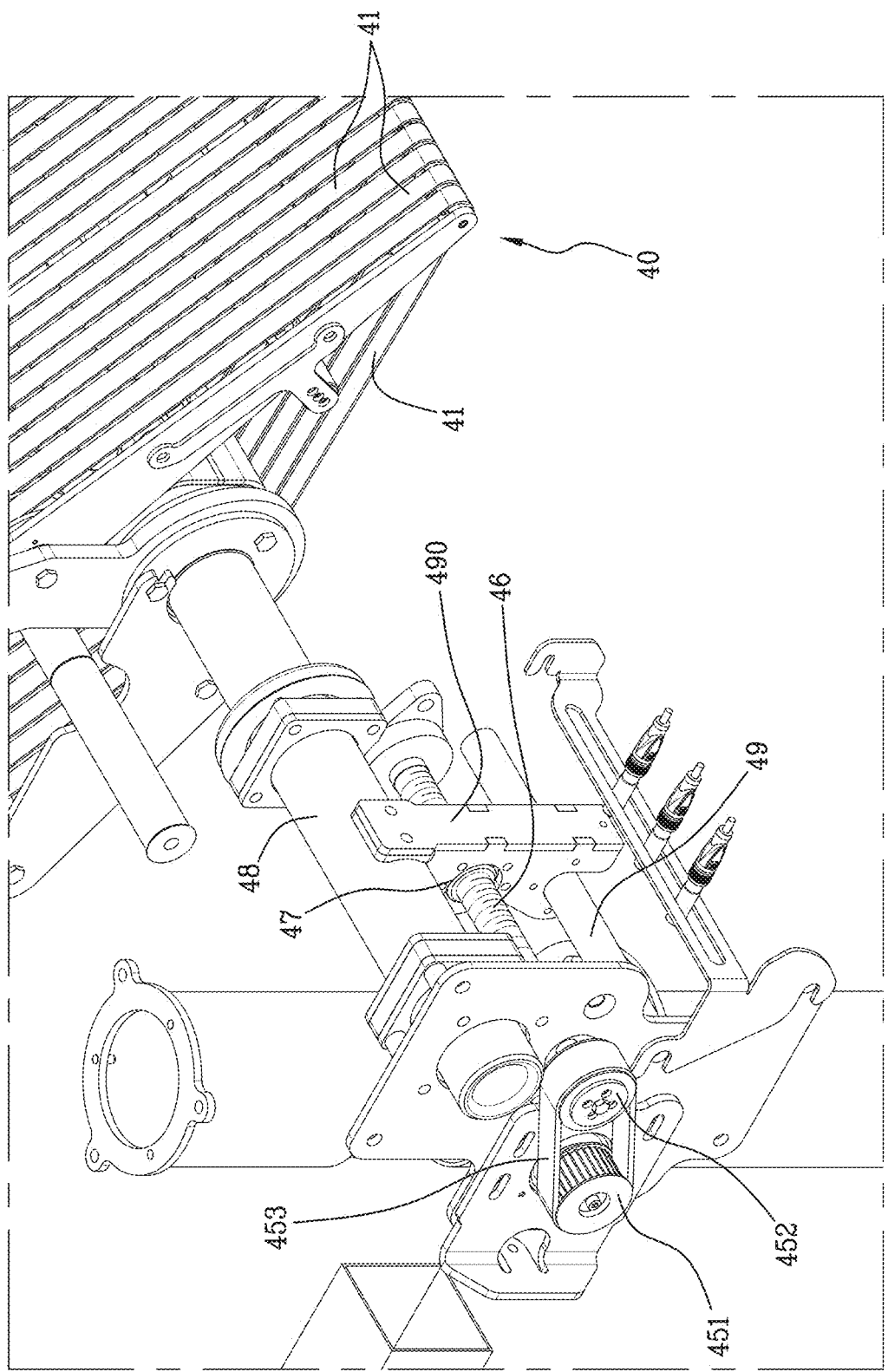
FIG. 4C is a partially exploded axonometric view of a portion of a machine, in which a mechanism that activates the lateral shifting of a front head piece of a conveyor of loose slices.

In the illustrated example, the third actuator 45, 46, 47 includes an endless screw 46 that engages a nut 47 that is solidly constrained to the end portion 40 of the first conveyor 4 (see in particular FIG. 4C).

The screw 46 is located transversely to the first conveyor 4 and the nut 47 is movable in an axial direction with respect to the screw 46.

In further detail, the nut 47 can be fixed to a sleeve 48, or another slidable linear element, which is, in turn, fixed to the first conveyor 4 at the end portion 40.

In the case, the sleeve 48 is arranged transversely to the first conveyor 4, that is, transversely to the conveying direction of the sliced products 2.

The endless screw 46 can be set into rotation owing to a motor 45 (shown in FIG. 4A).

In particular, the third actuator 45, 46, 47 can include a motor 45 that sets into rotation a first pulley 451 connected to a second pulley 452 by means of a transmission means such as a belt 453, with the second pulley 452 fixed coaxially to one end of the screw 56.

In the preferred embodiment of the invention, the third actuator 45, 46, 47 also comprises an anti-rotation guide 49 to force the nut 47 to move only in translational motion along the axis of the screw 46, that is, along its longitudinal extension.

For example, bracketing 490 can be provided, joining the sleeve 48 to the nut 47. The bracketing 490 shapes a concave seat that receives a linear element 49 such as a bar or suchlike, and it is located parallel to the axis of rotation of the screw 46, that is, to the axis of translational motion of the nut 47.

The bar 49 is fixed and the concave seat engages the bar 49 so as to prevent the bracketing 490, and thus the nut 47, from rotating on itself, keeping it always in the same angular position with respect to the axis of translational motion.

The processing unit 7 can include a shift module 73 configured to produce a shift signal, and suitable for determining the lateral position of the end portion 40.

In this case, the third actuator 45, 46, 47 is able to receive the shift signal and to regulate the lateral movement of the first conveyor 4 as a result.

In fact, the third actuator 45, 46, 47 is subjected to the shift module 73 of the processing unit 7.

The purpose of the shift module 73 is to move the head piece 40 laterally so as to lay the sliced product 2 in the desired lateral position in the container 3.

If, for example, one wishes to insert a single pack in the container 3, it can be laid centrally with respect to the container 3, whereas if one wishes to set down a number of packs in different rows, they will be placed in distinct lateral positions inside the container 3.

This aspect shall be dealt with in further detail below.

The positioning apparatus preferably includes a fourth actuator 81, 82 that is able to vary the inclination of the above-mentioned end portion 40 of the first conveyor 4.

In the preferred embodiment, the fourth actuator 81, 82 comprises a fourth motor that is able to rotate a cogwheel 8 with respect to its central axis (see FIGS. 5-9).

The motor and the wheel 81 are preferably arranged under the hinge of the end portion 40 of the first conveyor 4, with the motor housed for example in the above-cited transverse sleeve 48 (and for this reason, it is not represented in the illustrative figures).

In this case, the cogwheel 81 protrudes from one end of the sleeve 48.

Moreover, the fourth actuator 81, 82 comprises a toothed sector 82 that meshes with the cogwheel 81 cited above and that is solidly constrained to the end portion 40 so as to produce rotation about the hinge, that is, about the axis of oscillation O.

Preferentially, the toothed sector 82 is arranged between the cogwheel 81 and the hinge pin.

In other embodiments, a different gear can be provided, connected to the fourth motor or the end portion 40 can comprise a pivot pin directly fitted on the axle of a motor, etc.

The processing unit 7 preferably comprises an inclination module 74 configured to regulate the inclination of the end portion 40 of the first conveyor 4, based on at least one inclination parameter.

In practical terms, this inclination is defined by the angular position of the end portion 40 with respect to the axis of oscillation O that passes through the hinge pin or in any case, at the section joining the end portion 40 and the upstream part of the first conveyor 4.

In even further detail, the inclination module 74 is configured to generate an inclination signal suitable for determining the angular position of the end portion 40.

In this case, the fourth actuator 81, 82 is able to receive said inclination signal from the processing unit 7 and to move the end part as a result.

In practical terms, the fourth actuator 81, 82 is subjected to the inclination module 74 of the processing unit 7.

The purpose of the inclination module 74 is to regulate the distance between the end of the end part 40 and the upper branch of the second conveyor 5, to enable proper laying of the slices 2 or the packs on the trays 3.

In particular, in the case in which the machine 1 is employed to form relative packs of partially overlapping slices 2 directly in the trays 3, then the distance between the end part 40 of the first conveyor 4 and the second conveyor 5 must to be progressively increased as a function of the number of slices 2 laid, so as to compensate for the decrease in the free space between the two conveyors 4, 5 due to the overlapping of the slices 2.

It is clear that for the purpose of increasing the distance, the end part 40 must be rotated upwards.

This aspect shall be dealt with in further detail in the explanation of the operation of the invention.

The processing unit 7 preferentially includes a first synchronization module 75 configured to synchronize the activation of the second conveyor 5 with that of the first conveyor 4.

The purpose of employing the first synchronization module 75 is to enable proper laying of the slices 2 or the packs from the first conveyor 4 onto the trays 3 brought by the second conveyor 5.

The first synchronization module 75 controls the second transport module 72, based on first synchronization parameters.

In even further detail, during the tray packaging stage, that is, the stage of laying the slice 2 from the head piece 40 of the first conveyor 4 onto the assigned tray 3, the second transport module 72 regulates the activation of the second conveyor 5 upon command by the first synchronization module 75.

In practical terms, like the speed of their advancement in the second conveyor 5, the position of the trays 3 and thus of the containers 3 is established based on the conveying speed of the slices 2 or packs on the first conveyor 4.

As the length of the transport surface of the first conveyor 4 is a fixed value, for each single machine 1, the first synchronization module 75 will receive as input the position of the product 2 to be packaged in trays along the transport surface, in a given instant, and the advancement speed of the first conveyor 4.

The position of the slice 2 or of the pack can be determined for example by the above-mentioned position sensor 61 or alternatively by means of the acquisition apparatus 6.

Therefore, based on the instantaneous position of the slice 2 or pack to be packaged in a tray and based on the speed of the first conveyor 4, the first synchronization module 75 commands the second conveyor 5 so as to establish:

the advancement of the second conveyor 5, which determines the positioning of a container 3 to receive the product 2 to be packaged in a tray, into a predetermined position under the end portion 40 of the first conveyor 4;

the instant in which the container 3 must begin its advancement, moved by the second conveyor 5, while the sliced product 2 is being laid;

the advancement speed of the container 3, preferably being equal to the advancement speed of the slice 2 or of the pack that is released from the end head piece 40.

The specific tray packaging modes shall be illustrated in greater detail in the explanation of the operation of the invention.

The processing unit 7 can include a centring module 76 to determine the centring degree of the slices 2 or of the packs that are moving on the transport surface of the first conveyor 4.

The centring module 76 is connected at the input to the detection apparatus 6 and it is configured to determine the centring degree of the product 2 to be tray packaged with respect to the lateral edges of the transport surface of the first conveyor 4.

Moreover, the centring module 76 produces deviation parameters, as a function of said centring degree; said shift module 73 regulates the lateral position of the head piece 40 based on the variation of the deviation parameters.

In further detail, the centring module 70 can be configured to determine the difference between the actual position of the slices 2 or packs and the ideal position in which the slices 2 or packs would prove to be centred with respect to the lateral edges of said transport surface.

In the preferred embodiment in which the detection apparatus 6 includes an image acquisition device, the centring module 76 is configured to analyse the images acquired by the detection apparatus 6, thereby determining the distances between the outline of a slice 2 or pack and the two opposite lateral edges (or sides).

To be more precise, the centring module 76 measures the distances between opposite points of the outline of the slice 2 or pack, closest to respective sides of the first conveyor 4 and, in proportion to the difference between the two distances, it defines a centring degree.

The centring module 76 can comprise or make use of an imaging program, including an imaging program of a known type or specifically devised for use in the proposed machine 1.

The purpose of the centring module 76 is to establish how centred the slices 2 or packs are so as to find out by how much the end portion 40 of the first conveyor should be shifted for the purpose of laying the product in the desired lateral position in the container 3.

In practical terms, the centring module 76 receives at the input the value of the current lateral position of the head piece 40, so as to calculate a relative deviation parameter that takes into account the deviation of the sliced product 2 from the central position and the deviation of the head piece 40 from its ideal central position (or from another reference point). Therefore, the centring module 76 makes use of a memory module 77 of the processing unit 7, where the relative lateral position of the head piece 40 is suitably updated upon each translation.

The processing unit 7 preferably comprises a user interface 78 configured to enable an operator to select or set at least one desired composition of slices 2 inside the containers 3.

The interface 78 can be provided with a display 781, for example a touchscreen, or associated with a keyboard or similar devices for interaction between an operator and the processing unit 7.

In general terms, the processing unit 7 is able to transmit control signals to the positioning apparatus, said control signals being suitable for determining the position of the first and second conveyor 5 with respect to each other, according to the selections made by the operator by means of the interface 78.

The processing unit 7 preferentially comprises a calculation module 70 that is subjected to the interface 78 and configured to produce one or more composition parameters as a function of the selection(s) made by the user by means of the interface 78.

Therefore, the operative modules of the processing unit 7 are suitable for transmitting control signals as a function of the composition parameters.

In practical terms, the composition parameters are representative of the operator's selections or configurations entered by means of the interface 78.

The composition parameters can include one or more of the parameters cited hereinabove: inclination parameters, first synchronization parameters, the first and second transport parameters, etc.

The control signals can include one or more of the signals stated hereinabove: the shift signal, inclination signal and the first and second transport signal.

It is clear that the operator can have a graphical interface available and represented on the display 781 to make the selection and that the user interface 78 converts the selections into composition parameters that can be processed by the operative modules.

Obviously, composition parameters contained in files loaded into the memory unit 77 by means of known information technology tools such as flash memory devices, etc. can be inserted directly into the processing unit 7.

To be more precise, the term "composition" is understood as the configuration of one or more packs arranged in the relative container 3.

The various compositions are distinguished by the number of slices 2 in the packs and by their arrangement with respect to each other, particularly as relates to their overlapping each other (see FIG. 10).

In further detail, one or more rows of slices 2 can be inserted in a container 3 and said rows can also partially overlap each other, each row comprising a number of slices 2 that can overlap each other differently.

To be more precise, the slices 2 in the same row or pack overlap to a degree corresponding to the extension of the contact surface, which is variable and can be determined by the operator by means of the interface. In practical terms, when the operator makes a composition selection by means of the user interface, for example by manually intervening on the display 781 or on the keyboard, the calculation module 70 produces the composition parameters processed by the operative modules of the processing unit 7, which thus transmits the command signals to the appropriate actuators of the machine 1.

The calculation module 70 converts the selections made by the operator by means of the interface 78 into commands for the other operative modules provided to regulate the actuators 43, 44, 45, 46, 47, 51, 52, 81, 82.

Optionally, a graphical interface representing the different compositions as indicators or as images can be available to the operator, for example as represented in FIG. 10.

When the operator selects the indicator or the desired image by touching the screen 781 or pressing keys, etc., the user interface 78 activates processing by the calculation module 70, which commands the appropriate operative modules in such a manner that they regulate the operation of the actuators of the machine 1, so that the composition of slices 2 selected is obtained inside the trays 3.

In further detail, the calculation module 70 is also subjected to the centring module 76, from which it receives the deviation parameters, which, as a function of the composition selected by the operator, determine, for each slice 2 or pack, how the shift module 73 commands the third actuator 45, 46, 47.

As stated above, the deviation parameters are also a function of the output signals of the detection apparatus 6 and of the current position of the head piece 40, which is recorded each time in the memory module 77.

In the preferred embodiment, the second transport module 72 is subjected to the first synchronization module 75, which is controlled by the calculation module 70.

In further detail, the first synchronization module 75 transmits to the second transport module 72 said second transport parameters, which are calculated based on the synchronization parameters of the calculation module 70 and based on the signal of the position sensor 61, if present, and the second transport parameters reach the processing unit 7.

The inclination module 74 is also subjected to the calculation module 70, from which it receives said inclination parameters.

The inclination parameters are calculated as a function of the specific composition; if the pack is formed in the tray 3, then the parameters vary based on the location of the slice 2 to be laid within the pack that is being formed.

The inclination module 74 can also use the memory module 77 to record the current angular position of the head piece 40 and to determine the difference with the final position, so as to command the fourth actuator 81, 82 accordingly.

Furthermore, the proposed machine 1 can include a third conveyor 9 to feed the empty trays 3 and to move the full trays 3 out; it too is subjected to the processing unit 7.

In further detail, the third conveyor 9 can be located parallel to the second conveyor 5.

The third conveyor 9 can include a conveyor belt 90, the transport surface of which is found alongside the upper branch of the carousel 5 of the second conveyor 5, substantially at the same height.

In this manner, the empty or full trays 3 can easily pass from one conveyor to the other.

The third and the second conveyor 5 are activated in the same conveying direction.

In the preferred embodiment, the belt of the second conveyor 5 is moved continuously and the empty trays 3 fed to the machine 1 are blocked by an abutment and stop element 91, located above the surface of the belt 90, without contact; the abutment element 9 can extend in a direction transverse to the direction of advancement of the trays 3.

The invention can be provided with a pusher element 92 subjected to the processing unit 7 and it transfers the previously blocked empty trays 3 from the third to the second conveyor 5, more specifically from the surface of the conveyor belt 90 to one of said attachments 53 of the carousel conveyor 5.

Downstream of the abutment element 91 and of the section of the machine 1 in which the tray packaging is carried out, there can be provided a retrieval mechanism 93, which is subjected to the processing unit 7 and arranged to pick up a full tray 3 from the relative attachment of the carousel conveyor 5 and transfer it onto the conveyor belt 90 so that it can be directed to the exit of the machine 1.

The operation of the proposed machine 1 is illustrated below, with reference to a preferential embodiment.

In further detail, the operation of the invention shall be initially explained in the illustrative case in which the machine 1 is fed with single slices 2 intended to form a pack composed directly on the assigned container 3.

By means of the interface 78 the operator selects the desired type of pack to be formed on each tray 3.

In particular, the interface 78 can be configured to enable the selection of the type and size of the slices 2 to be tray packaged, which brings about, on the part of the calculation module 70, the production of relative composition parameters for the purposes of regulating and managing the operation of the actuators.

In fact, based on the fact that the sliced products 2 to be tray packaged consist of steaks, beefsteaks, chicken breasts, fish steaks, etc., the composition of the packs can vary.

Furthermore, the interface 78 can be configured to enable selection of the type and size of the trays 3.

Following the selection made by the operator, the machine 1 is ready to receive the slices 2 and the trays 3.

The single slices 2 are then fed loose, one at a time, one after the other, to the first conveyor 4, even without a predetermined rate.

In particular, the single slices 2 are not necessarily located in a predefined relative position on the first conveyor 4. In other words, the positioning of the slices 2 can be entirely random.

The empty trays 3 are arranged on the belt of the third conveyor 9, which brings them as far as the abutment and stop element 91 cited above.

While it is being advanced by the first conveyor 4, a slice 2 is detected by said photocell 61 (or another device suited to this purpose) and the processing unit 7 records the time of this detection.

When the slice 2 reaches the video camera of the detection apparatus 6, the latter has just been activated by the processing unit 7.

The centring module 76 verifies the relative position of the slice 2 on the first conveyor 4 and, in accordance with this verification, with the current lateral position of the head piece 40 and with the selections made by the operator, the processing unit 7 establishes a possible lateral deviation of the same head piece 40 to the right or to the left.

When the head piece 40 is being moved laterally, the transport surface of the first conveyor 4 continues to advance and the slice 2 to be tray packaged thus descends along the inclined portion of the head piece 40.

If the tray 3 on which the slice 2 is to be laid already contains one or more slices 2 laid there previously and the thickness reached by the partial pack requires it, the head piece 40 is turned upwards for an angular distance at least sufficient to prevent interference between the end edge of the head piece 40 and the partial pack.

When the slice 2 arrives in the proximity of the end edge of the head piece 40, the assigned tray 3, which has been waiting below the head piece 40 in a retracted position with respect to the end edge, is advanced by the carousel conveyor 5 at the same advancement speed as the slice 2 so as to receive it in an optimal manner.

As stated above, the stage of releasing the slice 2 (or pack) and laying it in the tray 3 is regulated by the first synchronization module 75, which also receives indications from the calculation module 70 concerning the speed at which the tray is to be moved. Optionally, the first synchronization module 75 can be dependent on the first transport module 71 and automatically receive from the first transport module 71 the parameters concerning the speed at which to move the tray 3 when the slices 2 are being laid.

The tray packaging stages shall be described herein below in greater detail, referring to the case illustrated in FIGS. 5-9, in which some slices 2 have already been laid appropriately on a given container 3, thus defining a partial pack, and two additional slices 2 are tray packaged in the same container 3, one after the other.

FIG. 5 shows a slice 2 descending from the head piece 40 of the first conveyor 4, while the assigned tray 3 advances according to the modes established by the first synchronization module 75, as stated above.

Figure 6:
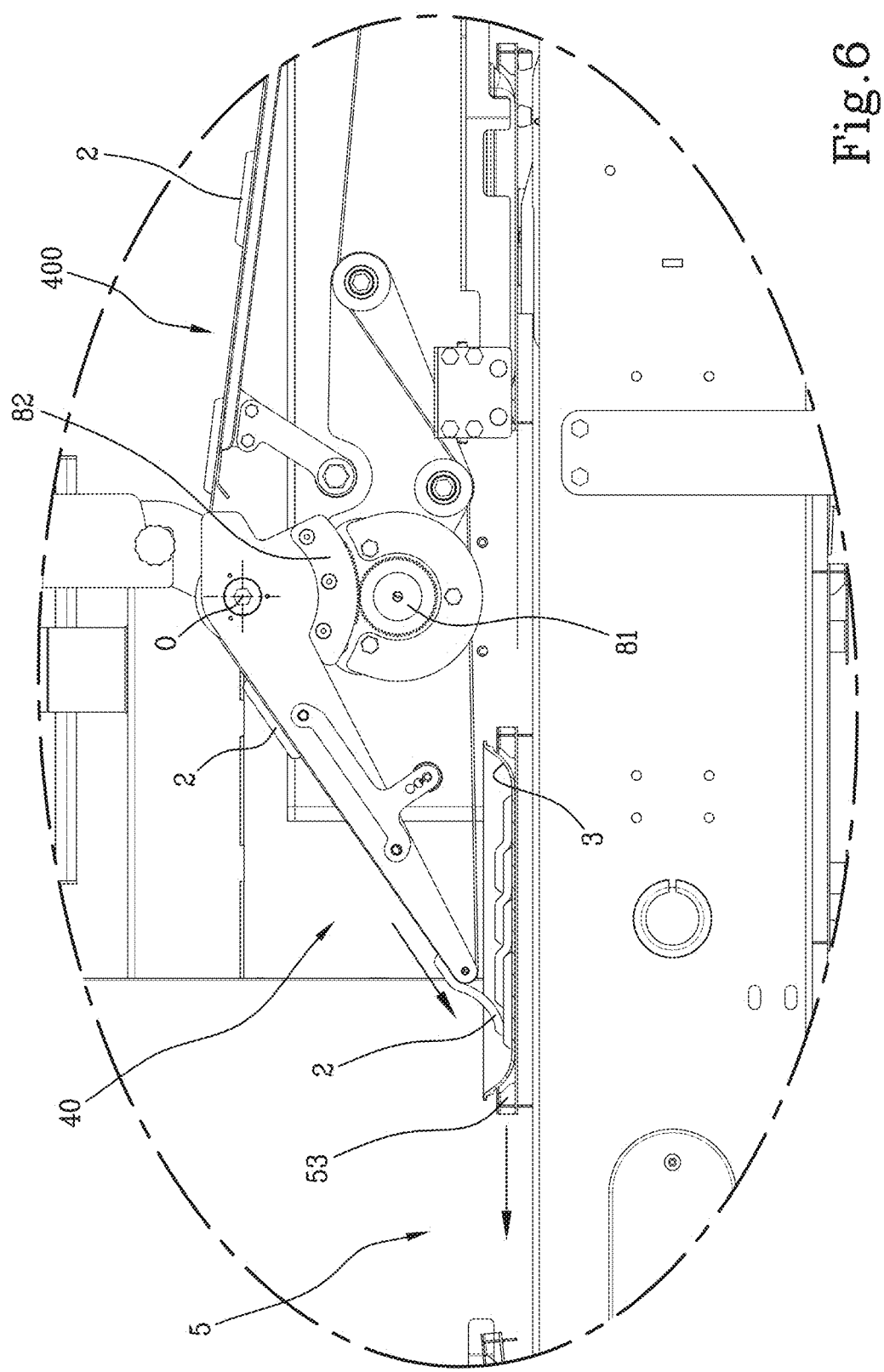

FIG. 6 shows the moment in which the slice 2 is transferred from the head piece 40 to the tray 3, where the slice 2 is placed on a predetermined point on the tray 3, over other slices 2 set down previously. The slices 2 are represented in a stylized manner and they constitute that which has been called a partial pack hereinabove.

Note that in the meantime other slices 2 to be tray packaged and found downstream of the one that has just been set down, are traveling on the first conveyor 4.

Figure 7:
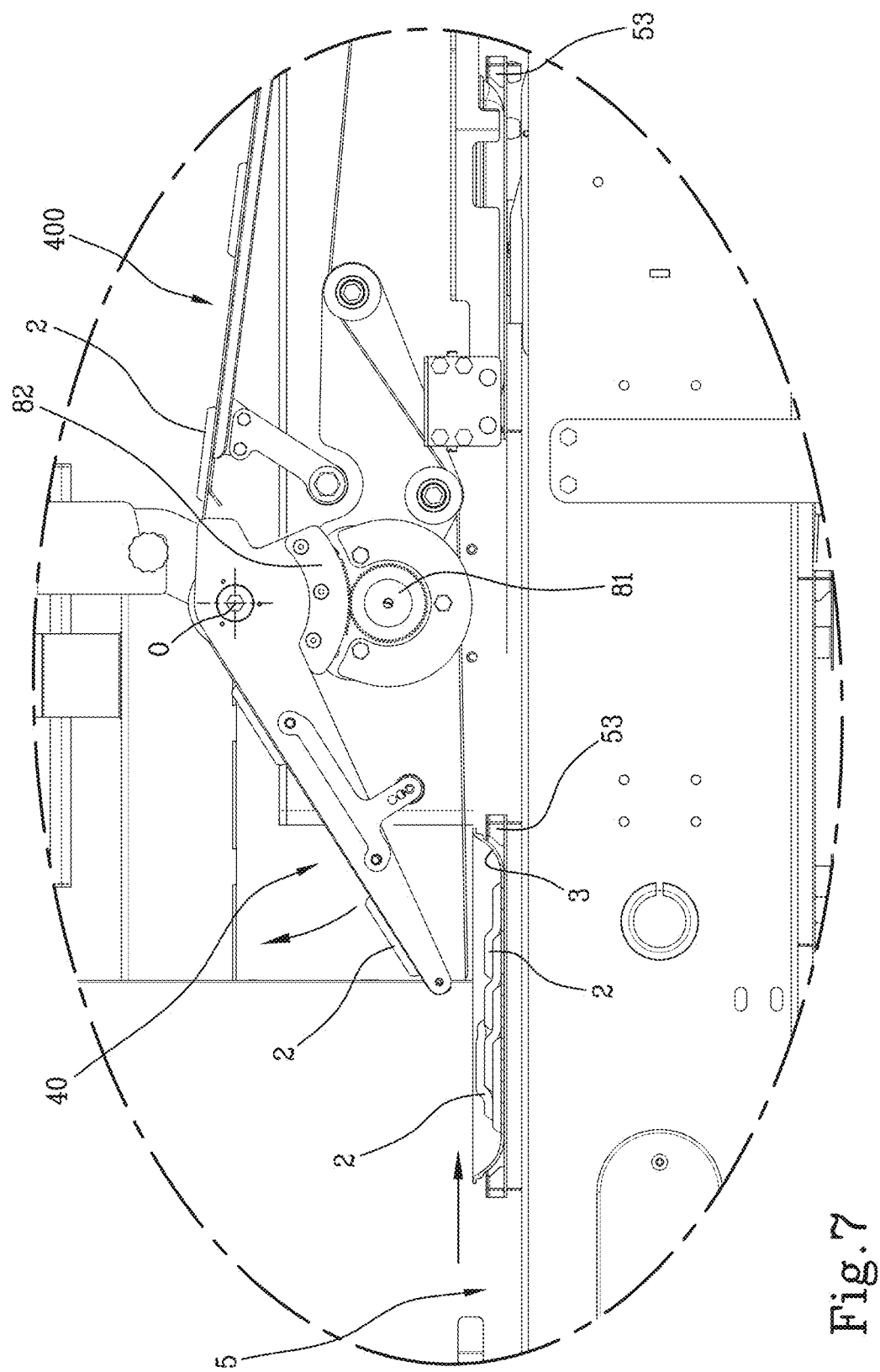

At this point, based on the number of slices 2 already laid in the same tray, based on the manner in which the partial pack has been composed, with particular reference to how the slices 2 have been overlapped, and based on the composition selected by the operator and the thickness of the slices 2, the processing unit 7 establishes that it may be necessary to raise the head piece 40, having it rotate about said axis of inclination (see FIG. 7). In the meantime, the same tray 3 is retracted, passing under the head piece 40, by one course of travel that can be fixed or variable, for the purpose of restoring the starting condition for the tray packaging action.

If the backward course of travel of the tray 3 is variable, this shall be a function of the position in which the next slice 2 to be tray packaged shall be laid in the pack, above or alongside the others.

Therefore, the return movement of the tray 3 is a function of one or more composition parameters produced by the calculation module 70.

The operation of inverting the movement of the second conveyor 5, prior to tray packaging, and the advancement operation during the laying stage are repeated cyclically, with variable courses of travel, for each one of the slices 2 assigned to the same tray 3, until the desired final composition is obtained.

The entire composition procedure described above is iterated for each tray 3 to be filled, during an operating cycle in which the machine 1 supplies at the exit trays 3 filled with slices 2 all arranged in the same manner, that is, with the same composition.

The processing unit 7 can comprise a second synchronization module 79 configured to determine when and for how long the second conveyor 5 has to invert its movement.

In further detail, the length of the course of travel carried out by the second conveyor 5 in the direction opposite the direction in which it advances during the tray packaging stage may also have to established, each time, in that different slices 2 can be placed at different points of the longitudinal extension of the same tray.

This result could also be achieved by means of the regulation that the first synchronization module 75 performs on the activation of the second conveyor 5.

The processing performed by the second synchronization module 79 is a function of the second synchronization parameters.

In the preferential embodiment of the invention in which the processing unit 7 comprises said calculation module 70, it controls the second synchronization module 79, transmitting to the second synchronization module 79 second synchronization parameters as a function of the selections made by means of the user interface.

In further detail, the second synchronization module 79 controls the second conveyor 5 in accordance with the position of the subsequent slice 2 to be tray packaged along the transport surface of the first conveyor 4 (e.g., as detected by the photocell 61 cited hereinabove).

The second synchronization module 79 is configured to generate third transport parameters suitable for regulating the activation of the second conveyor 5 between successive placements of slices 2 in the same tray 3. In practical terms, said second transport module 72 is subjected to the second synchronization module 79 and it receives from the latter the third transport parameters.

Figure 8:
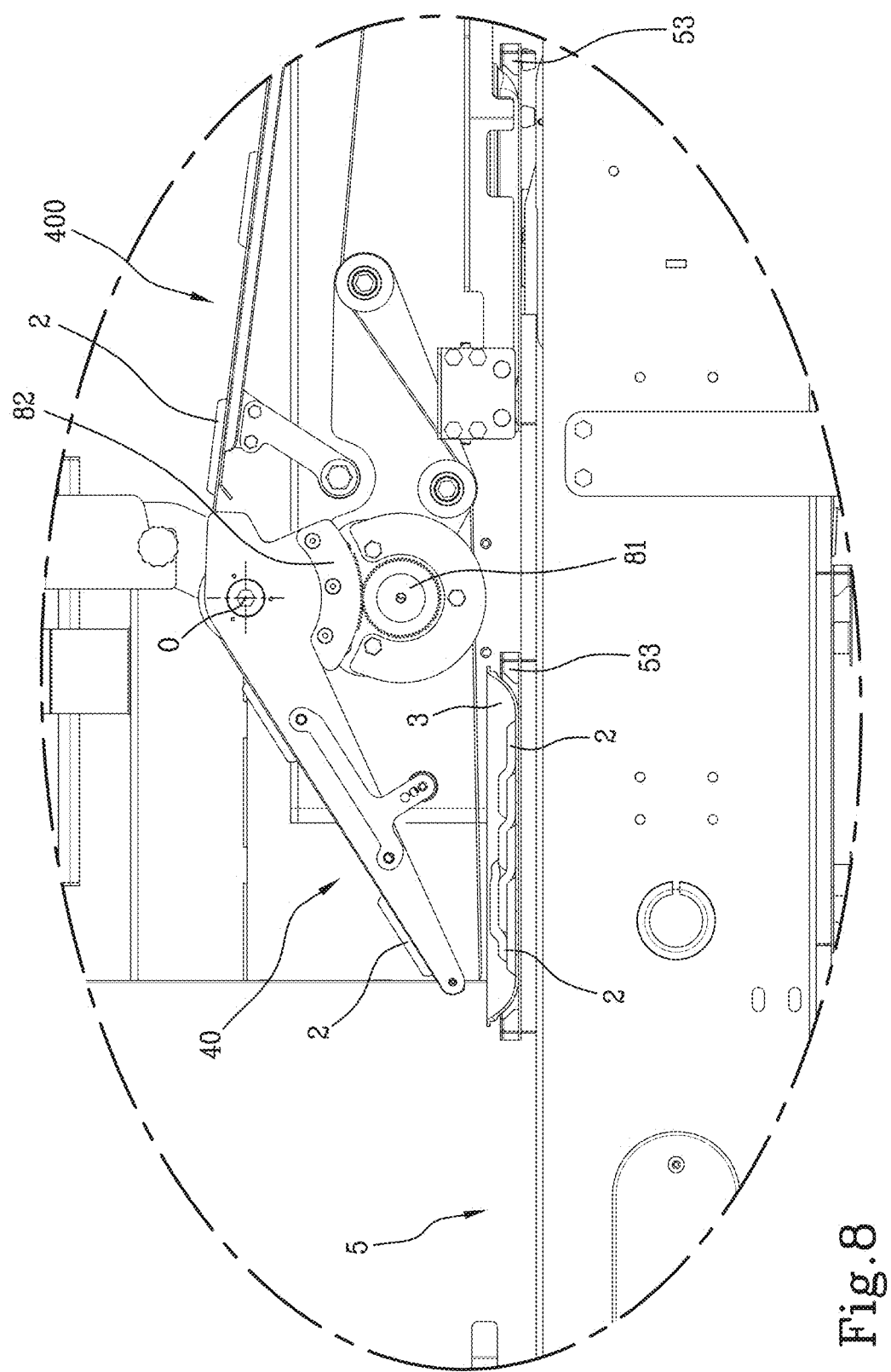
Figure 9:
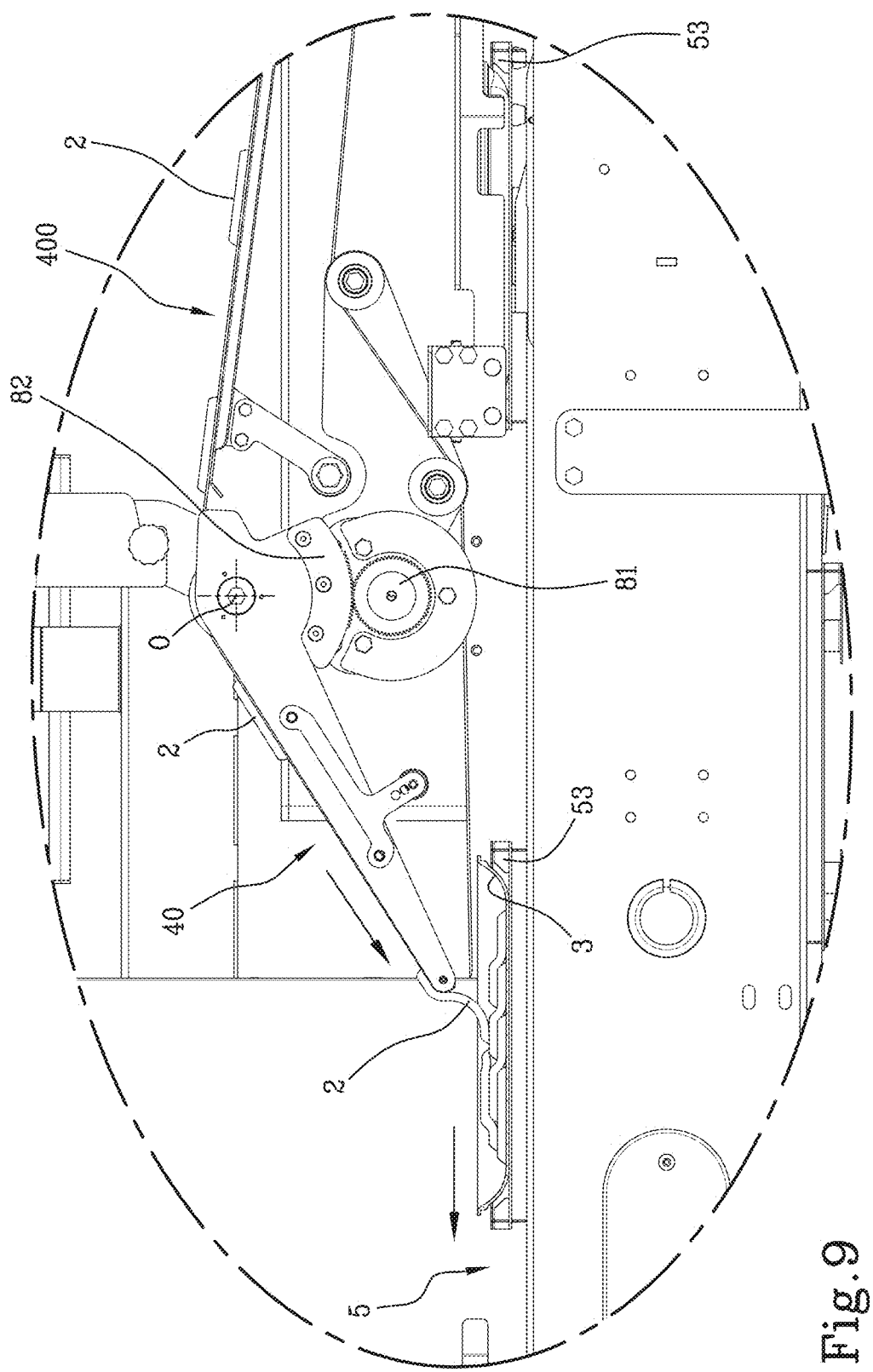

At this point, as can be seen by the succession shown in FIGS. 8 and 9, the tray packaging stage is repeated, but with the end edge of the head piece 40 set at a greater height, so as to enable constant placement efficiency for all the slices 2 placed in the tray 3.

In the case of laying a sliced product constituted by a previously formed pack, the first synchronization module 75 coordinates the advancement of the tray 3 with the descent of the pack along the head piece 40 of the first conveyor 4, so that the pack is tray packaged in the desired position and in a correct manner in the assigned container 3.

Once again, the regulating modes implemented by the first synchronization module 75 on the second conveyor 5 are defined by the first synchronization parameters produced by the calculation module 70, based on the selections made by the operator by means of the user interface 78.

When a tray 3 has been filled, that is, when it contains the desired composition of a sliced product 2, the processing unit 7 commands the advancement of the tray 3 along the upper branch of the carousel conveyor 5 as far as a position in which it can be reached by the above-mentioned retrieval mechanism 93.

At this point, the filled tray 3 is moved onto said third conveyor 9, which provides for conveying it to the exit of the machine 1 or into a packaging station, where, for example, it shall be wrapped in a plastic wrap.

It is thus evident that the invention completely overcomes the limits of the machines of the prior art, first of all by making it possible to achieve constant tray packaging quality, that is to say, obtaining at the exit an indefinite number of trays 3 in which the sliced product 2 is always located in the desired position and in particular it is always centred correctly.

Moreover, and above all, the proposed machine 1 makes it possible to obtain any desired type of composition, starting from a succession of separate slices 2 fed in random positions on the first conveyor 4.

In further detail, note that the machine 1 is capable of obtaining the desired packs and more in general the desired composition of slices 2, by forming the composition directly on the assigned tray 3, and thus without the machine 1 having to be fed with pre-formed packs and without having to provide "rest stations" where the packs being defined are temporarily parked.

The invention claimed is:

1. A machine (1) for laying sliced food products (2) in containers (3), comprising:
    a first conveyor (4) having a conveying portion configured to convey slices (2) or groups of slices (2) along at least one advancement direction and provided with an end portion (40) from which the slices (2) are released;
    a second conveyor (5) having an initial portion located adjacent a source of containers (3) and adapted to receive a feeding of said containers (3); the second conveyor (5) having a conveying portion downstream of said initial portion, the conveying portion being configured to convey said containers (3) in at least a second direction, said containers (3) being suitable for receiving one or more slices (2) from said end portion (40) of the first conveyor (4), at least a portion of the conveying portion of said second conveyor (5) being located under the first conveyor (4); said at least one advancement direction extending in a first vertical plane, said second direction extending in a second vertical plane which is parallel with said first vertical plane; and a positioning apparatus (45, 46, 47, 81, 82) for regulating the arrangement of the first and the second conveyor (4, 5) with respect to each other;

wherein the machine (1) comprises at least a detection apparatus (6) able to determine an arrangement of the slices (2) or of the groups of slices (2) on the first conveyor (4), and a processing unit (7) connected to said positioning and detection apparatuses and configured to control the positioning apparatus, according to detections carried out by the detection apparatus (6);

wherein the processing unit (7) comprises a first synchronization module (75) configured to synchronize the activation of the second conveyor (5) with that of the first conveyor (4), when laying a slice (2) or a group of slices (2) from the first conveyor (4) to an assigned container (3) moved by the second conveyor (5);

wherein a position sensor (61) is provided, which is associated with the first conveyor (4), able to detect the passage of a slice (2) or of a group of slices (2) and connected to the processing unit (7), the first synchronization module (75) being configured to control a second transport module (72) according to the advancement speed of the first conveyor (4) and detections carried out by said position sensor (61);

wherein the processing unit (7) comprises a user interface (78) configured to enable an operator to select or configure desired compositions of slices (2) within respective containers (3), the processing unit (7) transmitting command signals to the positioning apparatus according to the selections made by the operator by means of said interface (78);

wherein the processing unit (7) comprises a calculation module (70), subjected to the user interface (78) and configured to produce composition parameters as a function of the selections made by the operator; and wherein said first synchronization module (75) is configured to synchronize the activation of the second conveyor (5) with that of the first conveyor (4), as a function of first synchronization parameters produced by the calculation module (70).

2. The machine (1) according to claim 1, wherein the second conveyor (5) is mounted in a fixed position with respect to a support frame (10) of the machine (1) and the first conveyor (4) is able to vary its position and/or configuration with respect to the second conveyor (5).

3. The machine (1) according to claim 1, comprising a first and a second actuator (43, 44, 51, 52) able to activate the first and the second conveyor (4, 5), respectively, the processing unit (7) comprising a first transport module (71) and the second transport module (72), to which the first and the second actuator are respectively subjected, said first and second transport modules (71, 72) being configured to determine the advancement speed and direction of the first and of the second conveyor (4, 5).

4. The machine (1) according to claim 1, wherein the positioning apparatus comprises an actuator (45, 46, 47) able to move at the least a movable part (40) of the first conveyor (4) transversely to said direction of advancement of the slices (2), the processing unit (7) comprising a shift module (73), to which the actuator (45, 46, 47) is subjected, said shift module (73) being configured to determine the lateral position of said movable part (40) of the first conveyor (4).

5. The machine (1) according to claim 4, wherein the movable part (40) of the first conveyor (4) includes the end portion (40).

6. The machine (1) according to claim 5, wherein the movable part (40) is rotatable with respect to an oscillation axis (O) and the positioning apparatus comprises an actuator (81, 82) able to vary the inclination of the movable part (40) of the first conveyor (4), the processing unit (7) comprising an inclination module (74), to which the actuator (81, 82) is subjected, said inclination module (74) being configured to determine the angular position of the movable part (40).

7. The machine (1) according to claim 1, wherein the processing unit (7) comprises a centring module (76) configured to determine a centering degree of the slices (2) or of the groups of slices (2) on the first conveyor (4), according to detections carried out by the detection apparatus (6).

8. The machine (1) according to claim 7, wherein the positioning apparatus comprises an actuator (45, 46, 47) able to move at the least a movable part (40) of the first conveyor (4) transversely to said direction of advancement of the slices (2), the processing unit (7) comprising a shift module (73), to which the actuator (45, 46, 47) is subjected, said shift module (73) being configured to determine the lateral position of said movable part (40) of the first conveyor (4) and wherein said centring module (76) is configured to control the shift module (73).

9. The machine (1) according to claim 7, wherein the first conveyor (4) comprises a movable transport surface delimited by opposite transverse edges and on which the slices (2) or the groups of slices (2) are arranged, wherein the detection apparatus (6) comprises an image acquisition device arranged above the first conveyor (4) and pointed towards said movable transport surface, the centring module (76) being configured to analyze the images acquired by said image acquisition device, thereby determining the distances between an outline of a slice (2) or of a group of slices (2) and said transverse edges of the transport surface, so as to define a relative centering degree.

10. The machine (1) according to claim 1, wherein the processing unit (7) comprises a second synchronization module (79) configured to determine when and for how long the second conveyor (5) has to invert its own conveying direction, prior to laying a slice (2) from the first conveyor (4) to a partially filled assigned container (3).

11. The machine (1) according to claim 1, comprising an inclination module (74) configured to determine the angular position of a movable part (40) of the first conveyor (4) as a function of inclination parameters produced by said calculation module (70).

12. The machine (1) according to claim 7, wherein the calculation module (70) is configured to control a shift module (73) as a function of deviation parameters produced by said centring module (76), according to detections carried out by the detection apparatus (6), the shift module (73) being configured to determine the lateral position of a movable part (40) of the first conveyor (4).

13. The machine (1) according to claim 10, wherein the second synchronization module (79) is configured to control the second conveyor (5) according to second synchronization parameters produced by the calculation module (70).

14. The machine (1) according to claim 1, wherein the second conveyor (5) in operation (a) conveys a preselected container (3) in a first conveying direction while a slice (2) or group of slices (2) is laid in said preselected container (3), (b) subsequently conveys the preselected container (3) in a second conveying direction which is opposite to the first conveying direction, and (c) subsequently conveys the preselected container (3) in the first conveying direction while another slice (2) or group of slices (2) is laid in said preselected container (3).

15. The machine (1) according to claim 14, wherein, in step (c), said another slice (2) or group of slices (2) is laid at least partially on top of a slice (2) or group of slices (2) which are already in the preselected container (3).

\* \* \* \* \*